Figure 1:
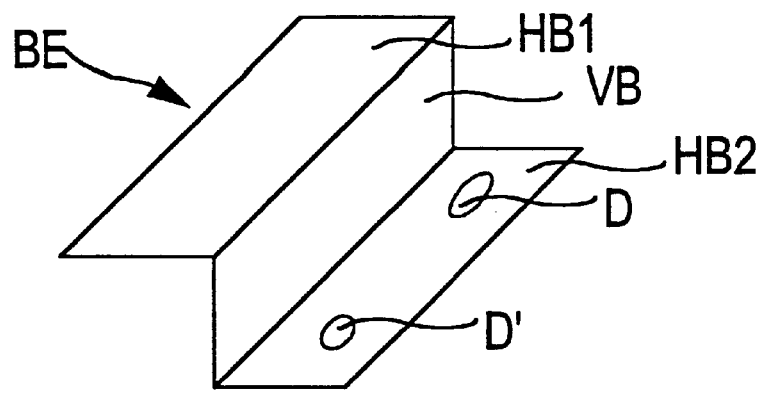

United States Patent
Bauer et al.

[11] Patent Number: 6,082,060
[45] Date of Patent: Jul. 4, 2000

[54] DEVICE FOR AFFIXING A FLAT PLATE-SHAPED BODY ONTO A SUPPORT

[75] Inventors: Ernst Bauer; Friedrich Wilhelm Schulze, both of Eching, Germany

[73] Assignee: Siemens Solar GmbH, Munich, Germany

[21] Appl. No.: 09/242,204
[22] PCT Filed: Aug. 11, 1997
[86] PCT No.: PCT/EP97/04358
   § 371 Date: Jun. 24, 1999
   § 102(e) Date: Jun. 24, 1999
[87] PCT Pub. No.: WO98/07196
   PCT Pub. Date: Feb. 19, 1998

[30] Foreign Application Priority Data

Aug. 12, 1996 [DE] Germany .......................... 196 32 493

[51] Int. Cl.⁷ .................................................. E04D 13/18
[52] U.S. Cl. ........................... 52/173.3; 52/200; 248/300; 248/500
[58] Field of Search ................................ 52/173.1, 173.3, 52/200; 136/244; 248/300, 500

[56] References Cited

U.S. PATENT DOCUMENTS

| | | | |
|---|---|---|---|
| Re. 25,647 | 9/1964 | Mann et al. | 136/244 |
| 1,535,747 | 4/1925 | Stuckert | 52/200 |
| 3,967,423 | 7/1976 | Hammond | 52/200 |
| 4,231,807 | 11/1980 | Keeling et al. | 136/251 |
| 4,373,783 | 2/1983 | Anderson . | |
| 5,470,396 | 11/1995 | Mongon et al. . | |
| 5,505,788 | 4/1996 | Dinwoodie | 52/173.3 X |
| 5,662,305 | 9/1997 | Shimamura et al. | 248/500 |
| 5,800,631 | 9/1998 | Yamada et al. | 52/173.3 X |

FOREIGN PATENT DOCUMENTS

| | | |
|---|---|---|
| 0 698 928 A2 | 2/1996 | European Pat. Off. . |
| 25 42 393 A1 | 9/1984 | France . |
| M 71 32 277 U | 11/1971 | Germany . |
| 32 18 013 C2 | 11/1983 | Germany . |
| 94 09 453 U1 | 9/1994 | Germany . |
| 43 13 739 A1 | 11/1994 | Germany . |
| 44 31 909 A1 | 3/1995 | Germany . |
| 295 10 151 U1 | 10/1995 | Germany . |
| 57-169544 | 10/1982 | Japan . |
| 03124070 | 5/1991 | Japan . |
| 04323006 | 11/1992 | Japan . |
| 08004245 | 1/1996 | Japan . |

*Primary Examiner*—Carl D. Friedman
*Assistant Examiner*—Kevin D. Wilkens
*Attorney, Agent, or Firm*—Wolf, Greenfield & Sacks, P.C.

[57] ABSTRACT

For simply affixing flat bodies, including solar modules, onto a support, Z-shaped metal profiles may be glued on the bodies, thus acting at the same time to affix the bodies and as a protective device for the edges of the bodies during transport.

8 Claims, 3 Drawing Sheets

DEVICE FOR AFFIXING A FLAT PLATE-SHAPED BODY ONTO A SUPPORT

Solar modules are constructed on large-surface substrates which are made of e.g. glass; such solar modules comprise large-surface solar cells or a plurality of individual solar cells that are directly produced on the substrate and which are optionally integrally connected. These solar cells are secured to the substrate, connected together and optionally designed to be weatherproof by means of a laminated cover.

To erect the solar modules, they are usually secured on a support which may be a separate trestle, the facade or roof of a building or any other natural or artificial support.

Solar modules may comprise a frame with prefabricated means for securing the solar modules to the support. Solar modules which comprise bores within the substrate for the purpose of attachment are also known.

Frameless solar modules may be secured to a support by means of suitable clamps. Such clamps are known for example from DE A 41 30 214 (=GR91P1452DE).

Solar modules having a frame suitable for attachment are not cheap to produce. The attachment of solar modules by means of clamps is a complex technical procedure and does not guarantee that the solar module is securely held within the clamp. The solar module and clamp have to be handled separately from one another. Solar modules with securing holes are not easy to produce, inter alia because there is also a risk of damaging the solar module when drilling the holes.

U.S. Pat. No. 4,373,783 describes a heliostat or a solar cell module having a U-shaped frame securing device. The first horizontal wall portion of the U-shaped frame securing device is connected by means of an adhesive to a backplate which contains an aluminum foil, while the vertical wall portion is disposed along the edges of the solar cell module. The second horizontal wall portion of the U-shaped frame securing device comprises holes for securing the frame to a load-bearing structure.

Japanese application JP 04-323006 A describes, e.g., a production process for an external wall panel by means of which a building's heat and moisture can easily escape. A z-shaped frame is essentially integrated into the external panel. The process is based on securing an essentially z-shaped frame to a solid mold by means of a flange and a pin. A pin is introduced into an aperture provided within the z-shaped support. The mold is then filled up, causing that part of the z-shaped profile which is opposite the flange to be embedded. The flange and the mold are then removed so that the securing frame projects from the solid mold.

The present invention's problem is therefore to design a means that can be easily and reliably used to attach solar modules and in general other flat plate-shaped bodies to a support.

In accordance with the invention, this problem is solved by a invention is a Z-shaped profile made from a sheet of metal and which is glued, along one edge, to the body to be secured. Through-bores for receiving securing means are provided in the second (lower) horizontal wall portion of the Z-shaped profile.

The body's stability with respect to warping and consequently with respect to rupture is increased by means of the glued metal profile member which is usually produced by bending, drawing or casting, since the metal profile member exhibits considerable stability to warping in its longitudinal axis.

The securing device can be glued to the body as a standard feature when producing or machining this body, thus enabling automated production or gluing. This reduces the effort involved in securing the body, thus allowing attachment work to be performed more quickly and easily than is e.g. the case with clamps. As compared to a securing frame, the securing device according to the invention enjoys advantages in terms of materials an d hence costs.

The securing device can be glued to the body such that the first vertical wall portion of the Z-shaped profile makes contact with an edge of the body. In this way, the body edge is additionally protected from damage, e.g. an impact. This protection is ensured after gluing the securing device to the body and it also protects this body during transportation if gluing takes place at a site remote from the support and occurs for example while the body is being produced or machined. After attachment, the body is disposed between the first horizontal wall portion of the Z-shaped profile and the support so that the first horizontal wall portion protects the body from separating from the support without exerting any loads on the adhesive site. But it is also possible for the securing device to be glued to the underside of the body. In this case, the adhesive site exhibits a strength and load capacity that is sufficient to attach the body securely.

In one embodiment of the invention, the securing device is glued on the solar module along a first edge in such a manner that the Z-shaped profile projects above the body edge adjacent thereto. In this way, the securing device is used to protect two edges or one corner of the body from damage.

In another embodiment of the invention, the body comprises a laminated structure into which the securing device is laminated. In this embodiment, no additional working step or adhesive is necessary to glue the securing device to the body. The stability of the laminated structure increases the securing device's hold on the body. Bodies which have a laminated structure are for example laminated solar modules.

In a further embodiment of the invention, the securing device is a metal profile member comprising at least one further vertical wall portion which with the first horizontal wall portion includes a perpendicular or obtuse angle and which with the first vertical wall portion also includes a right or obtuse angle.

This further vertical wall portion can be disposed on the same side as the first vertical wall portion or on the opposite side of the first horizontal wall portion. In th e latter instance, the edges are protected even if use is made of a securing device glued to the body at the bottom. In the former case, the securing device can be glued to a body corner which can in this way be protected from damage caused by impacts. This further vertical wall portion may be part of another Z-shaped profile and may also comprise through-bores in the second horizontal wall portion for the purpose of attachment to the support. A securing device is used in this way to hold the body at two edges, thereby also preventing the body from slipping in two directions.

The further vertical wall portion can be connected to the first Z-shaped profile by means of a common first horizontal wall portion, the first vertical wall portion or the second (lower) horizontal wall portion.

The invention will now be explained in more detail by means of exemplary embodiments and the associated 9 Figures.

Figure 3:
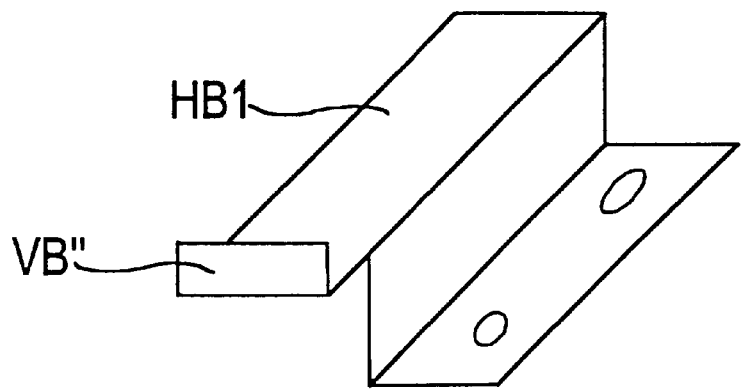
Figure 4:
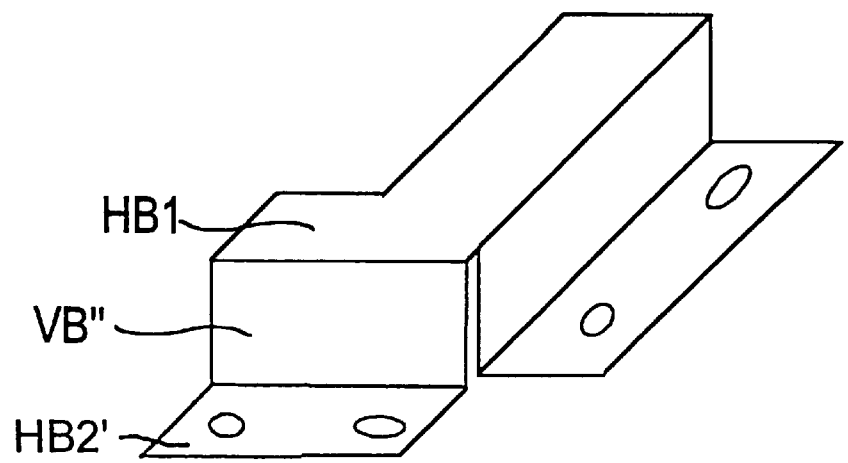
Figure 5:
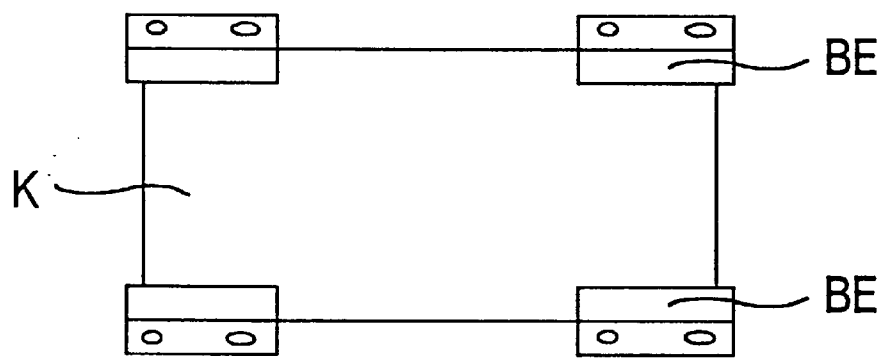
Figure 6:
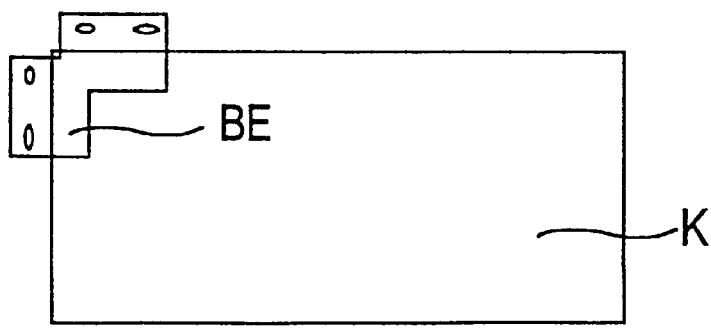
Figure 7:
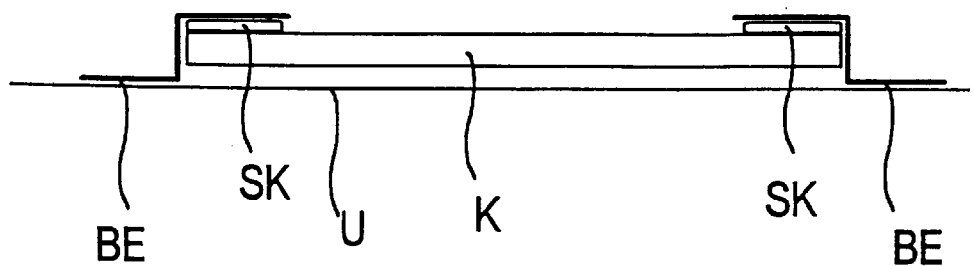
Figure 8:
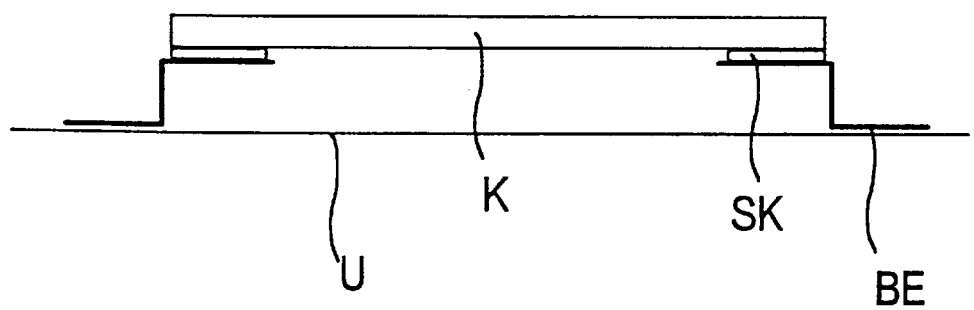
Figure 9:
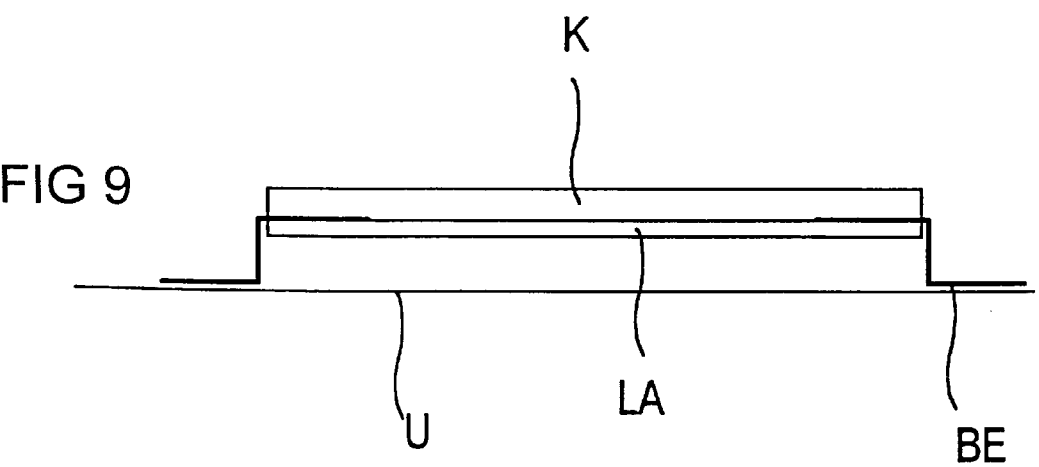

FIGS. 1 to 4 show various securing devices as a schematic perspective representation, FIGS. 5 and 6 show a body with glued securing devices in a schematic horizontal projection, and FIGS. 7 to 9 show a body with glued securing devices in a schematic cross section.

FIG. 1 shows the simplest embodiment of the invention in which the securing device BE is form ed as a metal profile member having a Z-shaped profile. This securing device comprises a first horizontal wall portion HB1, a wall portion VB approximately vertical thereto and a second horizontal wall portion HB2 depicted here with two through-bores D, D'. The one through-bore D' preferably has a circular cross section and the second through-bore D preferably has an elongated and e.g. oval cross section. Since the through-bores are nevertheless provided to receive a securing means, they can also be adapted thereto in terms of their cross section. A securing means may be a nail, a screw, a pin, a rivet or the like. The type of securing means depends on the type of support to which the body is secured with the aid of the securing device and the securing means. The through-bores D, D' can also break through the outer edge of the securing device or of the second horizontal wall portion HB2 and hence can be outwardly open.

The securing device is made of metal, e.g. sheet steel or sheet aluminum. Depending on the type of body to be secured and depending on the desired strength, this securing device has e.g. a thickness of 0.5 to 5 mm, e.g. 3 mm stainless steel, or 1 to 5 mm aluminum.

Figure 2:
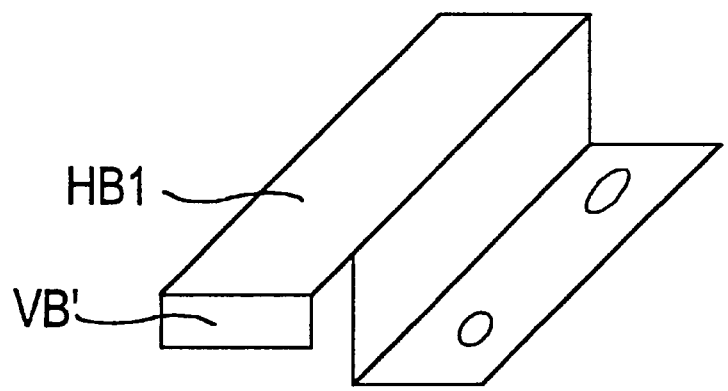

FIG. 2 depicts an exemplary embodiment comprising another vertical wall portion VB'. This wall portion forms, both with the first horizontal wall portion HB' and with the first vertical wall portion VB, a right or obtuse angle, depending in each case on the corner angle and the edge cross-section of the body to be secured. In the Figure, the second vertical wall portion VB' is disposed on the same side of the first horizontal wall portion HB1 as the first vertical wall portion VB.

FIG. 3 shows a similar embodiment to FIG. 2, but with the difference that here the other vertical wall portion VB" points in the opposite direction to the first vertical wall portion VB. This embodiment is particularly suited to being glued to the underside of the body to be secured. The other vertical wall portion VB" can then serve as an edge limit stop on the body.

FIG. 4 depicts a securing device BE that comprises a further Z-shaped section which with the first Z-shaped section includes an angle chosen in accordance with the corner angle of the body. In the Figure, both Z-shape d sections are connected via the common horizontal wall portion HB1. It is which is shown as having an L-shape also possible for the two Z-shaped sections to be connected via the vertical wall portions VB and VB'".

Also shown is an additional horizontal wall portion HB2' associated with vertical wall VB'"

FIG. 5 shows a body K with four glued securing devices BE which may be designed here in accordance with FIGS. 1, 2 or 3. The depicted arrangement makes it possible to attach the body K on the support in a secure and reliable manner. If the bodies are correspondingly large, more than two securing devices per edge can, however, also be correspondingly glued to the body. The securing device BE is advantageously glued such as to protrude over the abutting edge of the body, as shown. This makes it possible to transport securely an optionally sensitive body such as a solar module since its corners are protected in this way.

The optimum length for securely attaching a body depends on the length of the body edge and on the desired strength. In the case of rectangular bodies K such as solar modules, it is also possible to provide the entire narrow side of the body (solar module) with a securing device BE of a length corresponding at least to the solar module's width. A longer body of e.g. 120 cm is secured by at least two securing devices BE which may then have e.g. a length of 30 cm respectively.

FIG. 6 shows a body K with a glued securing device corresponding to FIG. 4; this device makes contact with two edges of the body and makes it possible both to protect reliably the edges of the body during transit and to attach the body securely to the support.

FIG. 7 shows a body K having two glued securing devices BE in a schematic cross section. In the Figure, the securing devices are glued to the "upwardly" pointing body surface. Having been secured to a support, the body is held in this way between the first horizontal wall portion HB1 and the support U. If the body is a solar module having at least one glass surface, this surface is preferably used to glue the securing device, whereby a silicone adhesive known from the construction of facades can be used as an adhesive SK.

The height of the first vertical wall portion VB may correspond to the sum of the thickness of the body K plus the thickness of the adhesive site SK or it may be chosen to be larger. The first case allows the body K to be attached so as to rest on the e.g. level support U. In the latter case, it is possible to secure the body K within the clearance above the support U. This may be of advantage if it is desirable to ventilate the body at the rear, e.g. to cool a solar module during photovoltaic operation, since efficiency rises at lower temperatures.

To secure a solar module in a supporting manner the securing device BE has e.g. a height of 6.2 mm when the glass substrate is 4 mm, solar cells 1 mm, the cover 0.2 mm and the adhesive layer 1 mm thick.

FIG. 8 shows a body K that comprises securing devices BE glued "at the bottom". This version is beneficial if just the underside has a surface suitable for gluing the securing device. One example thereof is a solar module which has an upwardly pointing structure laminated on a glass substrate. The top-most layer of this laminated structure is a cover film to which gluing is indeed possible, but is less advantageous.

FIG. 9 shows a body K with a laminated structure LA. The securing device BE can also be advantageously integrated into this laminated structure during production of this structure. Since tacky layers are normally-used for lamination, e.g. hot-melt adhesive films in the case of solar modules, the adhesive SK and an additional gluing step are eliminated. In this way, the strength of the securing device's adhesive bond on the body is increased. As well as the configuration depicted, the laminated structure may also point downwards.

The support shown in all the embodiments as a level surface may also be designed differently, e.g. a framework-like structure. The support U can also be in a perpendicular position or at an arbitrary angle.

The term "support" should not be understood as an arrangement beneath the body. Rather, the securing device according to the invention can also be used to secure, from below, a body to an overhanging surface or a ceiling. The invention therefore enables any flat body to be secured to almost any support in any alignment. The invention is, however, advantageously applied in solar modules, particularly frameless ones, in which case the invention enables simple and secure attachment to a support and simultaneously offers almost the same mechanical protection for the solar module as a frame.

What is claimed is:

1. A frameless solar module comprising:
    a frameless solar laminate body (K) including solar cells in a laminated structure, and
    at least two securing devices (BE)

which each comprise a metal profile member with a Z-shaped profile having a first horizontal wall portion (HB1), a first vertical wall portion (VB) substantially perpendicular to said first horizontal wall portion (HB1), and a second horizontal wall portion (HB2) substantially perpendicular to said first vertical wall portion (VB) in the opposite direction to said first horizontal wall portion (HB1), said first vertical wall portion (VB) of which is disposed along edges of said solar laminate body (K), said first horizontal wall portion (HB1) of which is glued into said solar laminate body (K), said solar laminate body (K) being made of glass at least on the surface to be glued, and said second horizontal wall portion (HB2) of which has at least one through-bore (D,D') for receiving a securing means.

2. A frameless solar module according to claim 1, wherein a second vertical wall portion (VB') is provided, said second vertical wall portion being substantially perpendicular to said first horizontal wall portion (HB1) and forming a substantially right angle with said first vertical wall portion (VB).

3. A frameless solar module according to claim 1, wherein said first horizontal wall portion is L-shaped, and a second vertical wall portion is provided perpendicular to the first horizontal wall portion and to the first vertical wall portion; said second vertical wall portion including a third horizontal wall portion substantially perpendicular to said second vertical wall portion in the opposite direction to said first horizontal wall portion.

4. A frameless solar module comprising:

a frameless solar laminate body (K) including solar cells in a laminated structure, and at least two securing devices (BE)

which each comprise a metal profile member with a Z-shaped profile having a first horizontal wall portion (HB1), a first vertical wall portion (VB) substantially perpendicular to said first horizontal wall portion (HB1), and a second horizontal wall portion (VB2) substantially perpendicular to said first vertical wall portion (VB) in the opposite direction to said first horizontal wall portion (HB1), said first vertical wall portion (VB) of which is disposed along the edges of said solar laminate body (K), said first horizontal wall portion (HB1) of which is glued to said solar laminate body (K), said solar laminate body (K) being made of glass at least on the surface to be glued, and said second horizontal wall portion (HB2) of which has at least one through-bore (D, D') for receiving a securing means, wherein that surface of said first horizontal wall portion (HB1) closest to said first vertical wall portion (VB) is glued to said solar laminate body (K) and wherein the height of the first vertical wall portion (VB) is such that there is a clearance between the second horizontal wall portion (HB2) and said solar laminate body (K).

5. A frameless solar module according to claim 4, wherein said first horizontal wall portion (HB1) is glued into said solar laminate body (K).

6. A frameless solar module according to claim 4, wherein said first horizontal wall portion (HB1) of said securing devices is glued to said solar laminate body (K) by means of a silicone adhesive (SK).

7. A frameless solar module according to claim 4, wherein a second vertical wall portion (VB') is provided, said second vertical wall portion being substantially perpendicular to first horizontal wall portion (HB1) and forming a substantially right angle with said first vertical wall portion (VB).

8. A frameless solar module according to claim 4, wherein said first horizontal wall portion is L-shaped, and a second vertical wall portion is provided perpendicular to the first horizontal wall portion and to the first vertical wall portion; said second vertical wall portion including a third horizontal wall portion substantially perpendicular to said second vertical wall portion in the opposite direction to said first horizontal wall portion.

* * * * *